US007428328B2

(12) United States Patent
Jee et al.

(10) Patent No.: US 7,428,328 B2
(45) Date of Patent: Sep. 23, 2008

(54) METHOD OF FORMING A THREE-DIMENSIONAL IMAGE OF A PATTERN TO BE INSPECTED AND APPARATUS FOR PERFORMING THE SAME

(75) Inventors: Yun-Jung Jee, Gyeonggi-do (KR); Chung-Sam Jun, Gyeonggi-do (KR); Yu-Sin Yang, Seoul (KR); Tae-Kyoung Kim, Gyeonggi-do (KR)

(73) Assignee: Samsung Electronic Co., Ltd., Suwon-si, Gyeonggi-do (KR)

( * ) Notice: Subject to any disclaimer, the term of this patent is extended or adjusted under 35 U.S.C. 154(b) by 610 days.

(21) Appl. No.: 11/180,504

(22) Filed: Jul. 12, 2005

(65) Prior Publication Data

US 2006/0011837 A1 Jan. 19, 2006

(30) Foreign Application Priority Data

Jul. 13, 2004 (KR) ...................... 10-2004-0054562

(51) Int. Cl.
*G06K 9/00* (2006.01)

(52) U.S. Cl. ....................... 382/145; 382/147; 382/149; 382/154

(58) Field of Classification Search ................. 382/145, 382/147, 149, 154
See application file for complete search history.

(56) References Cited

U.S. PATENT DOCUMENTS

2004/0032979 A1 * 2/2004 Honda et al. ................ 382/145

FOREIGN PATENT DOCUMENTS

| | | |
|---|---|---|
| JP | 2000-074649 | 3/2000 |
| JP | 2001-044253 | 2/2001 |
| JP | 2003-107022 | 4/2003 |

OTHER PUBLICATIONS

English language abstract of the Japanese Publication No. 2000-074649.
English language abstract of the Japanese Publication No. 2001-044253.
English language abstract of the Japanese Publication No. 2003-107022.

* cited by examiner

*Primary Examiner*—Matthew C. Bella
*Assistant Examiner*—Mike Rahmjoo
(74) *Attorney, Agent, or Firm*—Marger Johnson & McCollom, P.C.

(57) ABSTRACT

In a method and apparatus for forming a three-dimensional image for an inspection pattern, a reference intensity function of an inspection X-ray is formed in accordance with a continuous scanning depth, and is differentiated with respect to the scanning depth. The differential reference intensity function is decomposed into a start function and a characteristic function. The differential reference intensity function is then repeatedly integrated while a temporary vertical profile function is substituted for the start function until the temporary intensity of a reference X-ray is within an allowable error range. The temporary vertical profile function satisfying the error range is selected as an optimal vertical profile function. A surface shape is combined to the optimal vertical profile function along a depth of the inspection pattern to thereby form the three-dimensional image for the inspection pattern.

27 Claims, 7 Drawing Sheets

METHOD OF FORMING A THREE-DIMENSIONAL IMAGE OF A PATTERN TO BE INSPECTED AND APPARATUS FOR PERFORMING THE SAME

CROSS-REFERENCE TO RELATED APPLICATION

This application relies for priority upon Korean Patent Application No. 2004-54562 filed on Jul. 13, 2004, the content of which is herein incorporated by reference in its entirety.

BACKGROUND OF THE INVENTION

1. Field of the Invention

The present invention relates to a method and an apparatus for forming a three-dimensional image of a pattern to be inspected, and more particularly, to a method of forming a three-dimensional image of a pattern using X-rays without fracturing the pattern.

2. Description of the Related Art

As semiconductor devices are becoming highly integrated and are operating at higher speeds, design rule requirements and contact areas of the devices are being continuously reduced. This reduction has lead to requirements to form a finer pattern and a smaller contact hole on the pattern. The fine pattern and smaller contact hole require an improved measuring technology for detecting a critical dimension or a processing defect thereof. Furthermore, the fine pattern and smaller contact hole require a novel measuring technology fundamentally different from a conventional measuring technology in the case of an ultra-fine process having a critical dimension of no more than about 100 nanometers.

Examples of a fatal process defect due to the reduced critical dimension include a void in an insulation interlayer and a bridge defect in a contact structure for a metal wiring or a stacked capacitance. Typically, an optical instrument or an electron beam has been utilized for measuring the fatal process defects. However, the scaling down of the critical dimension leads to difficulty in measuring the defects.

In general, the fatal process defects are shown in a pattern profile while patterning a layer on a substrate, such that various research has been conducted for analyzing a structure of a vertical profile of the pattern. A vertical scanning electron microscope (V-SEM) and a transmission electron microscope (TEM) have been used for analyzing the vertical profile of the pattern and forming a three-dimensional pattern profile. In the V-SEM, an electron beam is projected to a cross sectional surface of a pattern cut along a vertical line, and thereby detects secondary electrons generated from the cross sectional surface of the pattern. The detected secondary electrons generate an electrical signal, and an image corresponding to the cross sectional surface of the pattern is formed from the electrical signal. In the TEM, an electron beam is also projected to a cross sectional surface of a pattern cut along a vertical line, and tunnel electrons generated from the cross sectional surface of the pattern are detected. An image corresponding to the cross sectional surface of the pattern is formed corresponding to a voltage variance due to the tunnel electrons.

The V-SEM and TEM are advantageous in that they have superior analysis performance with a high degree of precision. However, they also have a disadvantage in that a sample pattern is required for the implementation of these microscopes and thereby requires the sample pattern to be broken down through a destructive analysis. Furthermore, the use of V-SEM and TEM require large expenditures of time to achieve the analysis. That is, the use of V-SEM and the TEM are problematic in that the specimen for the analysis is broken down (e.g., is fractured) and is disposed of after the analysis. Recently, an optical method has been introduced for this type of analysis; however, the method is problematic in that the process and calculation on processing data are very complicated and too cumbersome to apply to a practical analysis on the vertical pattern profile.

Accordingly, there is still need for an improved method of forming a three-dimensional profile of a pattern, or alternatively, a three-dimensional vertical image of a pattern that does not require the fracturing the sample pattern.

SUMMARY OF THE INVENTION

Accordingly, the present invention provides a method of forming a three-dimensional image for an inspection pattern on a substrate without fracturing the inspection pattern and the substrate. Additionally, the present invention also provides an apparatus for performing the above method.

According to an exemplary embodiment of the present invention, there is provided a method of forming a three-dimensional image for an inspection pattern on a substrate. An intensity of an inspection electromagnetic wave is measured from the inspection pattern on a substrate, and an intensity of a reference electromagnetic wave is also measured from a reference pattern on a reference specimen. The reference pattern has the same surface shape and material properties as the inspection pattern. A differential function of the reference intensity function, which is a continuous function of the intensity of the reference electromagnetic wave with respect to a depth of the reference pattern, is decomposed into a start function and a characteristic function. The start function expresses a vertical profile function of the reference pattern, and the characteristic function determines material properties of the reference pattern. An integration of the differential function of the reference intensity function is iterated many times to thereby obtain an intensity of a temporary reference electromagnetic wave while a temporary vertical profile function is substituted for the start function at each iterative step, until the intensity of the temporary reference electromagnetic wave is determined to be within an allowable error range. The substituted temporary vertical profile function, by which the intensity of the temporary reference electromagnetic wave is determined to be within the allowable error range, is selected as an optimal vertical profile function. The surface shape of the inspection pattern is combined with the optimal vertical profile function along a depth of the inspection pattern to thereby form the three-dimensional image for the inspection pattern.

According to another exemplary embodiment of the present invention, there is provided an apparatus for forming a three-dimensional image for an inspection pattern on a substrate. The apparatus comprises an electromagnetic wave generator, a detector, a function decomposer and a profile generator. The electromagnetic wave generator generates an inspection electromagnetic wave from the inspection pattern on a substrate and a reference electromagnetic wave from a reference pattern on a reference specimen. The reference pattern has the same surface shape and material properties as the inspection pattern. The detector detects intensities of the inspection electromagnetic wave and the reference electromagnetic wave, respectively, and stores each of the electromagnetic wave intensities in accordance with a corresponding scanning depth from which the electromagnetic wave is generated. The function decomposer decomposes a differential function of a reference intensity function into a start function and a characteristic function. The reference intensity function is a continuous function of the intensity of the reference electromagnetic wave with respect to a depth of the reference pattern, and the start function expresses a vertical profile function of the reference pattern and the characteristic function determines material properties of the reference pattern. The profile generator generates the three-dimensional image for the inspection pattern, and includes a selection unit for determining an optimal vertical profile function and a combination unit for combining the surface shape of the inspection pattern and the optimal vertical profile function along a depth of the inspection pattern. The optimal vertical profile function is a temporary vertical profile function such that an intensity of a temporary reference electromagnetic wave is within an allowable error range when the temporary vertical profile is substituted for the start function.

According to the present invention, various three-dimensional images for various inspection patterns are obtained through an iterative process without fracturing the substrate and using an X-ray that is utilized for detecting a layer thickness or a concentration of a particular element of the layer. Accordingly, types and locations of the defects in the inspection pattern may be easily detected through the three-dimensional image of the inspection pattern.

BRIEF DESCRIPTION OF THE DRAWINGS

The above and other features and advantages of the present invention will become readily apparent by reference to the following detailed description when considering in conjunction with the accompanying drawings, in which.

DESCRIPTION OF THE EMBODIMENTS

The present invention now will be described more fully hereinafter with reference to the accompanying drawings in which exemplary embodiments of the present invention are shown.

Figure 1:
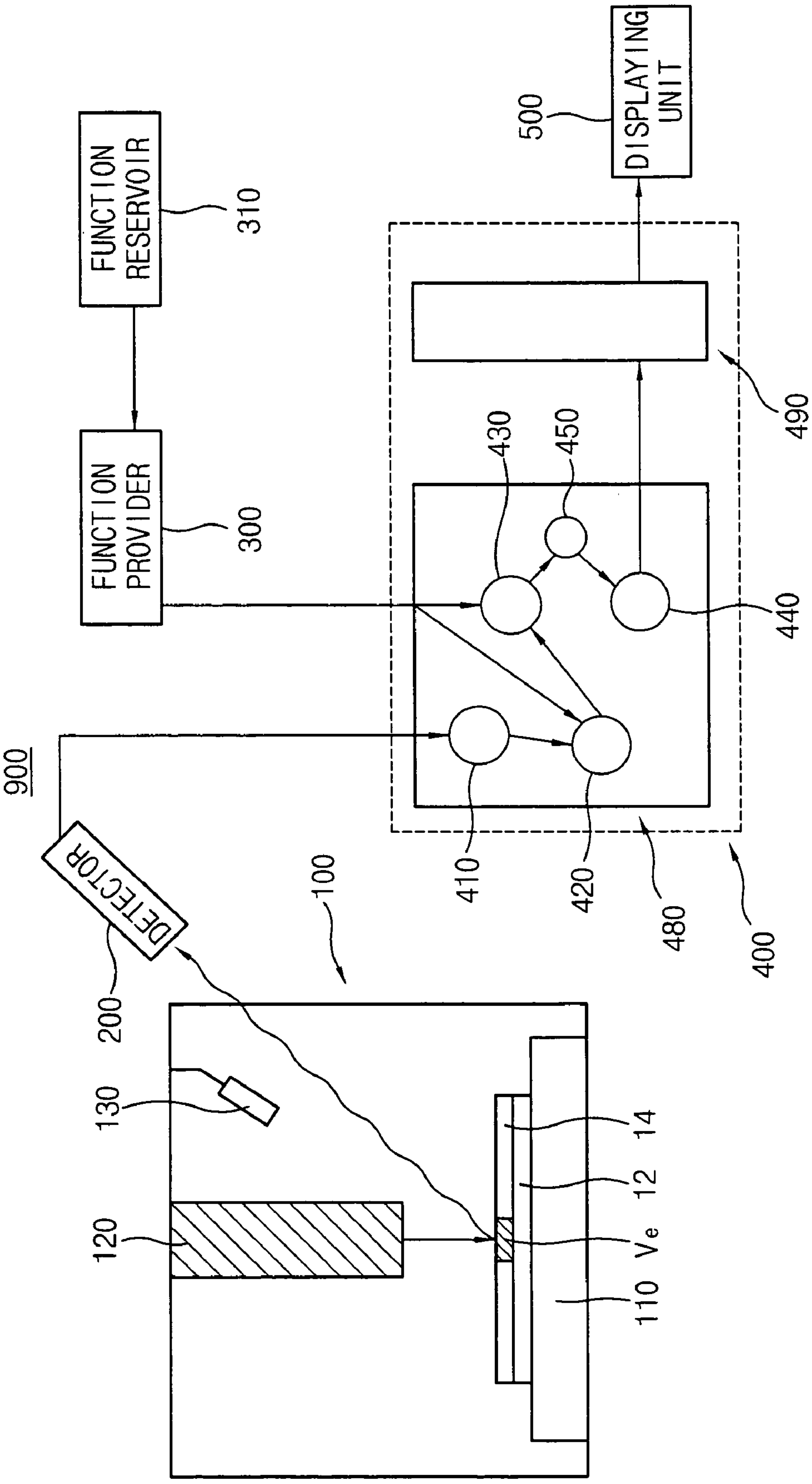
FIG. 1 is a view illustrating an apparatus for forming a three-dimensional image of an inspection pattern of an object, according to an exemplary embodiment of the present invention.

FIG. 1 is a view illustrating an apparatus for forming a three-dimensional image of an inspection pattern according to an exemplary embodiment of the present invention.

Referring to FIG. 1, an apparatus 900 for forming a three-dimensional image includes a generator 100 for generating an electromagnetic wave, a detector 200 for detecting the electromagnetic wave generated from the generator 100, a function provider 300 for providing a vertical profile function of a reference pattern and a profile generator 400 for generating a three-dimensional profile of the inspection pattern. The generator 100 generates the electromagnetic wave from an object (not shown) including the inspection pattern and from a reference specimen (not shown) including the reference pattern, respectively. The vertical profile function illustrates a continuous variance of a vertical profile of the reference pattern with respect to a depth of a thin layer on the reference specimen.

The generator 100 includes a support unit 110 for supporting the object or the reference specimen, and a scan unit 120 for scanning an electron beam onto the object or the reference specimen. In one embodiment, support unit 110 includes a flat top surface that supports the object or the reference specimen on the top surface, thereof.

As an exemplary embodiment, the object includes a semiconductor substrate on which a predetermined layer is coated, and the inspection pattern may be a contact hole formed on the layer or a structure including a line-spacer combination in which a spacer is formed between the lines of the pattern. In the present embodiment, the contact hole in the layer is exemplarily used as the inspection pattern to be inspected. However, the inspection pattern is not limited to the contact hole, as would be known to one of the ordinary skill in the art.

Figure 2:
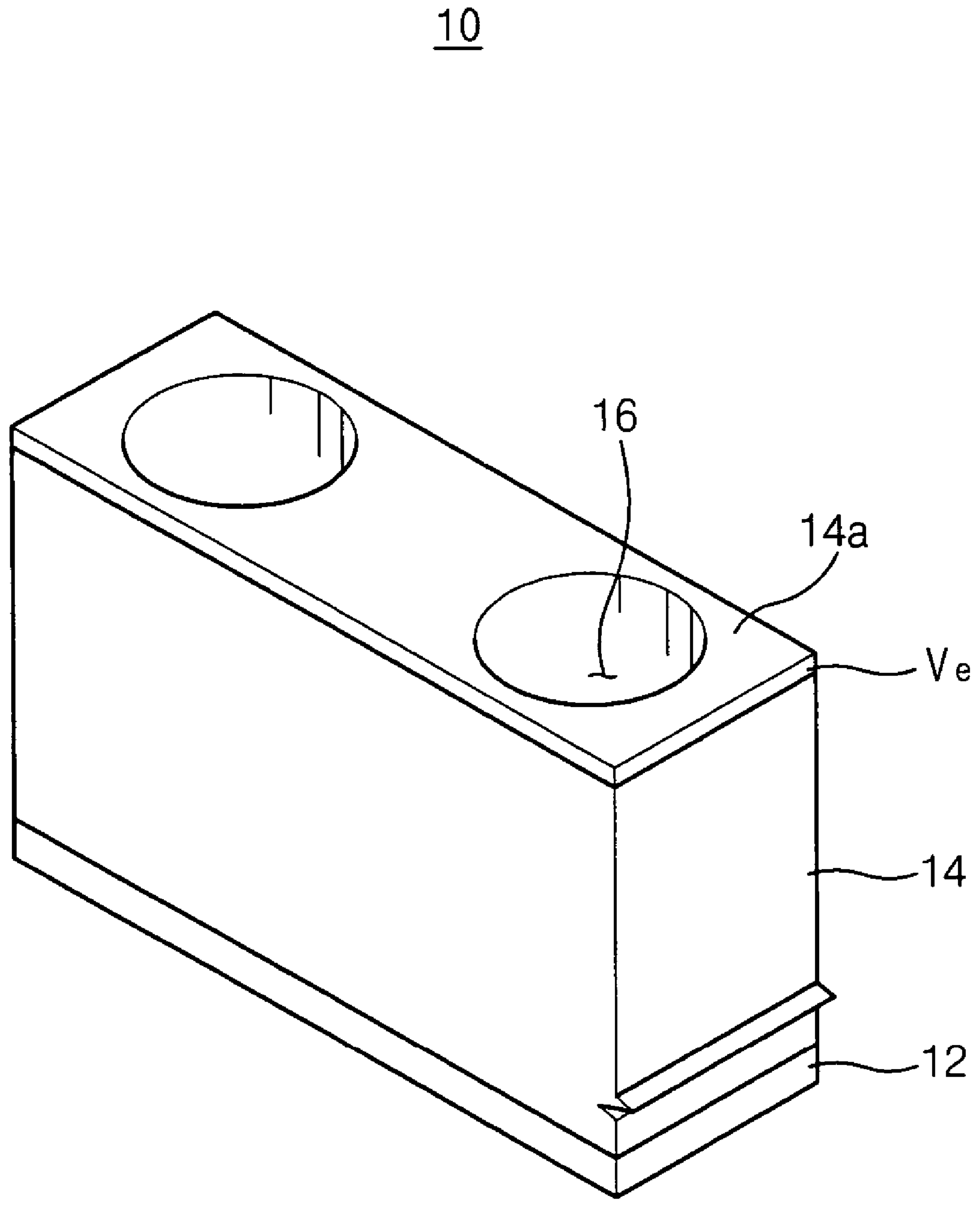
FIG. 2 is a perspective view illustrating a portion of the object in FIG. 1 including the contact hole.

FIG. 2 is a perspective view illustrating a portion of an object 10 including a contact hole. The contact hole is utilized as the inspection pattern that is to be inspected, and is referred to as an inspection contact hole 16.

Referring to FIG. 2, the object 10 includes a semiconductor substrate 12 and a layer 14 on the semiconductor substrate 12. The layer 14 is partially etched from a top surface 14*a* thereof to a predetermined depth through the layer 14 to form the inspection contact hole 16. Although a surface shape of the inspection contact hole 16 may be known on the top surface 14*a* of the layer 14, a vertical profile thereof is not known through the layer 14.

Referring to FIGS. 1 and 2, in operation the scan unit 120 is positioned over the support unit 110, and scans the electron beam onto the layer 14 including the inspection contact hole 16. When the electron beam reaches the top surface 14*a* of the layer 14, an excitation region $V_e$ is defined on the top surface 14*a* of the layer 14 by a predetermined volume of electrons. In the excitation region $V_e$ of the layer 14, an energy state of electrons of the layer 14 is shifted from a ground state to an excited state by the electron beam, and then is degraded into the original ground state while radiating a predetermined electromagnetic wave. The radiated electromagnetic wave varies in accordance with the material properties and the component elements of the layer 14. In one embodiment, the material properties and component elements of the layer 14 are provided such that an X-ray is radiated from the layer 14 during the degradation of the energy state in the form of the electromagnetic wave. That is, the apparatus 900 for forming the three-dimensional image of the inspection pattern utilizes the X-ray in the present embodiment. Although the above exemplary embodiments discuss the X-ray as an electromagnetic wave, the three-dimensional image of the inspection pattern could also be formed by any other electromagnetic wave known to one of the ordinary skill in the art. Hereinafter, the X-ray generated from the layer including the inspection pattern to be inspected is referred to as an inspection X-ray.

A plurality of various X-rays are generated from various scanning depth points of the layer that are different from each other in accordance with various driving voltages of the electron beam. When the driving voltage of the electron beam is increased, the energy state of the electron beam is also proportionally increased; thus, the electron beam reaches deeper into the layer 14 below the top surface 14$a$ of the layer 14 as the driving voltage is increased. Control of the driving voltage of the electron beam allows the inspection X-rays to be generated at various scanning depth points of the layer 14 that are different from each other. In such a case, an intensity of the inspection X-ray is proportional to an amount of the electrons shifted from the ground state to the excited state in the excitation region $V_e$.

Referring to FIGS. 1 and 2, a measuring unit 130 is positioned over the support unit 110 for measuring the surface shape of the inspection contact hole 16 on the top surface 14$a$ of the layer 14. In one embodiment, the measuring unit 130 may exemplarily include a scanning electron microscope (SEM). In this embodiment, the surface shape of the inspection contact hole 16 is measured through the SEM and is stored into a storing area (not shown) before the electron beam is scanned onto the top surface 14$a$ of the layer 14. Although the above exemplary embodiments discuss the measuring unit 130 positioned over the support unit 110, the measuring unit 130 may also be placed at any other position, as would be known to one of the ordinary skill in the art, only if the surface shape of the inspection contact hole can be measured.

The detector 200 detects the plurality of the inspection X-rays generated from various scanning depth points in the layer 14. In the present embodiment, the detector 200 includes a metal plate sensitive to the X-ray, and generates a current corresponding to the intensity of the detected X-ray. The detector 200 also stores the intensity of the detected inspection X-ray to a storing member (not shown) in relation to the corresponding scanning depth of the layer 14.

Subsequently, other X-rays are obtained from the reference specimen including the reference pattern in the same way as described above. The reference pattern has the same surface shape as the inspection pattern of the object, and the vertical profile thereof is already known. The object and the reference specimen substantially have the same material properties, except for a vertical profile of a pattern formed thereon. Hereinafter, the X-ray generated from the reference specimen is referred to as a reference X-ray. In the present embodiment, the reference specimen includes a reference contact hole formed in a layer of which the surface shape is the same as that of the inspection contact hole shown in FIG. 2 and of which a vertical profile is not varied with respect to a depth of the layer.

Figure 3A:
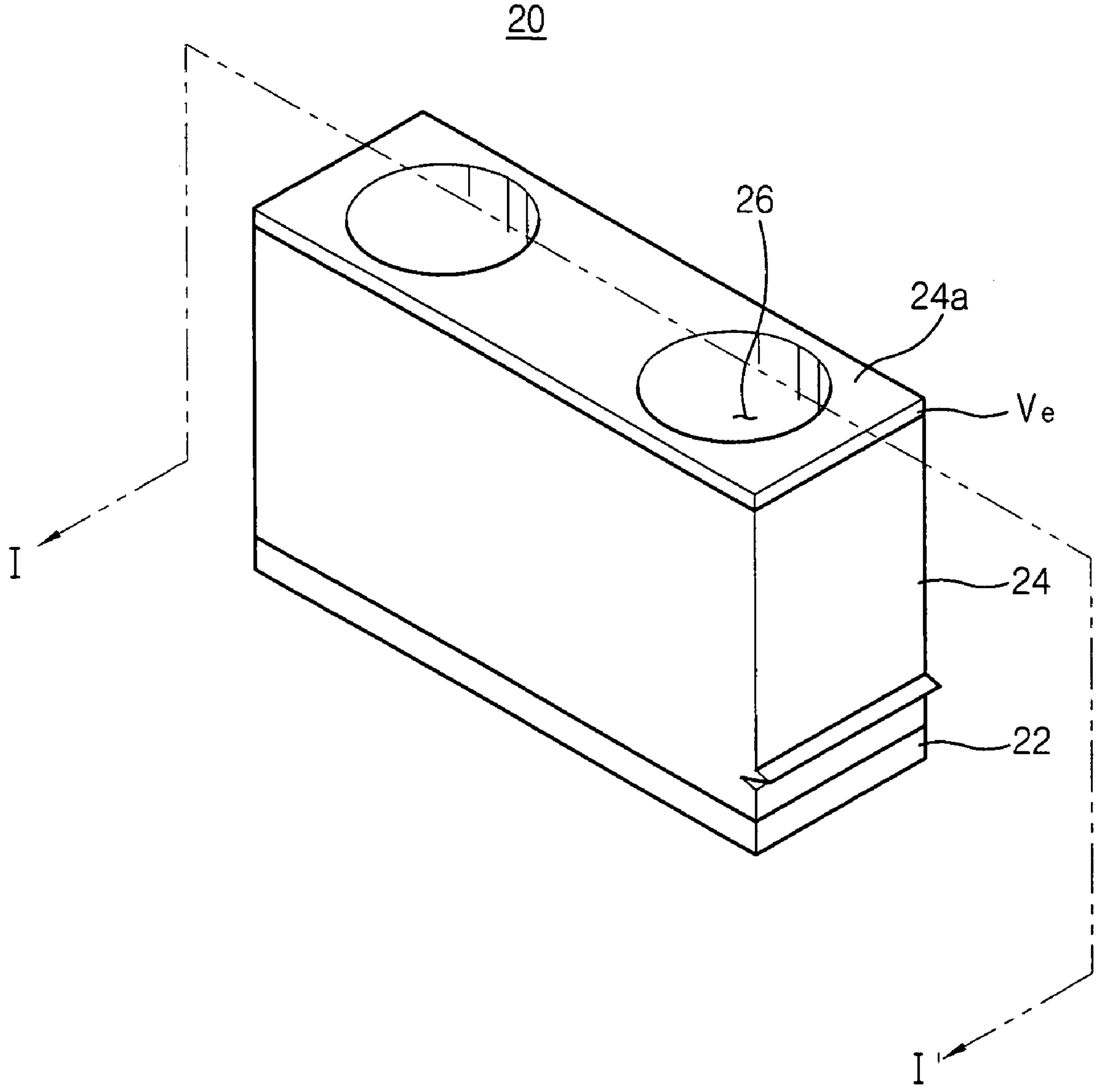
FIG. 3A is a perspective view illustrating a reference specimen including the reference contact hole of which a vertical profile is not varied with respect to the depth of the layer.
Figure 3B:
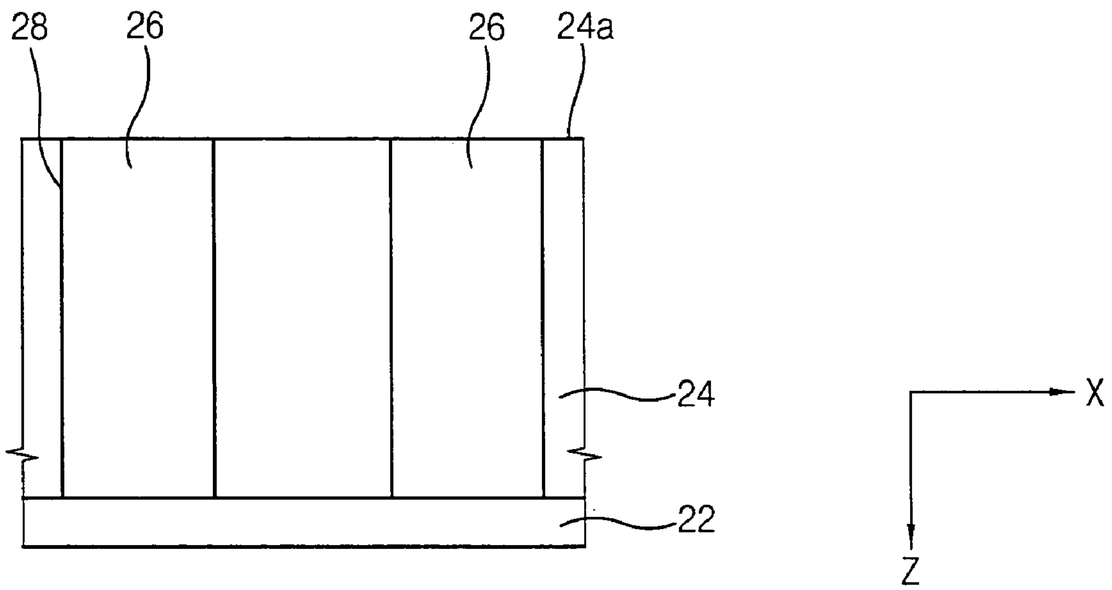
FIG. 3B is a cross-sectional view of the reference specimen taken along a line I-I' of FIG. 3A.
Figure 3C:
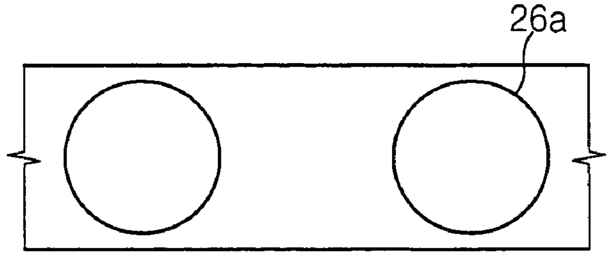
FIG. 3C is a top-down view illustrating the surface shape of a reference contact hole in the reference specimen.

FIG. 3A is a perspective view illustrating the reference specimen including the reference contact hole of which the vertical profile is not varied with respect to the depth of the layer. FIG. 3B is a cross sectional view taken along a line I-I' of FIG. 3A, and FIG. 3C is a top-down view illustrating the surface shape of the reference contact hole in the reference specimen. The reference specimen has the same surface shape as that of the object shown in FIG. 2, as described above.

In FIGS. 3A-3C, the reference specimen 20 includes a thin layer 24 on a semiconductor substrate 22. Referring to FIGS. 2 and 3A-3C, the material properties of the thin layer 24 are the same as the layer 14 in the object 10. A reference contact hole 26 is formed to a predetermined depth through the thin layer 24. In FIG. 3C, a surface shape 26$a$ of the reference contact hole 26 shown on a top surface 24$a$ of the thin layer 24 (see FIG. 3A) is substantially identical to the surface shape of the inspection contact hole 16 formed on the object 10 in FIG. 2. In the reference specimen, the surface shape 26$a$ is repeated along the depth of the thin layer 24 so that the reference contact hole 26 is formed into a cylindrical shape through the thin layer 24 and a vertical profile 28 of the reference contact hole 26 is expressed as a vertical line substantially perpendicular to the top surface 24$a$ of the thin layer 24.

Hereinafter, a Cartesian coordinate system is defined in the object 10 and the reference specimen 20 such that a z-axis directs the depth of the contact hole and an x-axis is perpendicular to the z-axis and is parallel with the top surface of the layer 14 and the thin layer 24. The thin layer 24, including the reference contact hole 26, is cut along the depth thereof such that a cross sectional surface is positioned on a Z-X surface with reference to the above coordinate system. Accordingly, the vertical profile 28 of the reference contact hole 26 of the reference specimen 20 is expressed as a constant function with respect to the z-axis.

Referring to FIGS. 1, 2 and 3A-3C, the reference specimen 20, including the reference contact hole 26 of which the vertical profile is a constant function, is transferred onto the support 110 in the generator 100, and the electron beam is scanned onto the reference specimen 20 at various driving voltages as described above. As a result, a plurality of reference X-rays is generated at various scanning depth points of the thin layer 24. Then, the detector 200 detects the reference X-rays and each intensity thereof. The detector 200 also stores the intensity of the detected reference X-ray at the storing member with reference to the corresponding scanning depth of the thin layer 24.

As a result, both the intensity of the inspection X-rays and the intensity of the reference X-rays are stored in the detector 200 in accordance with each respective scanning depth point, so that the intensity of the X-ray may be expressed as a discrete function of the scanning depth point with respect to the object 10 and the reference specimen 20, respectively.

Referring to FIG. 1, the function provider 300 provides a vertical profile function indicating a vertical profile of the reference pattern along the depth of the thin layer on the reference specimen to the profile generator 400. In one embodiment, the function provider 300 may exemplarily include a computer system and at least one coefficient for generating a function. The computer system generates a continuous function by using a function generating program and the supplied coefficient, and provides the continuous function to the profile generator 400 as the vertical profile function of the reference pattern. In this embodiment and referring to FIGS. 3A and 3B, a shape of the reference contact hole 26 in the reference specimen 20 is not varied along the z-axis, so that the function provider 300 provides a continuous constant function to the profile generator 400.

In one embodiment, a function reservoir 310 is electrically connected to the function provider 300, and includes a plurality of typical functions. The typical function refers to a function that is very frequently shown in a view of past experiences, and is presumed to express a vertical profile of the inspection pattern in the object 10 (see FIG. 2). In a subsequent step in the profile generator 400, the typical function is utilized as a temporary vertical profile function during an iteration process for obtaining an optimal vertical profile function by which the three-dimensional image with respect to the inspection pattern is generated.

The profile generator 400 for generating the three-dimensional image with respect to the inspection pattern includes a selection unit 480 for determining the optimal vertical profile function and a combination unit 490 for combining the optimal vertical profile function and the surface shape of the inspection pattern.

The discrete function between the intensity of the reference X-rays and the respective scanning depth is transformed into a continuous function by a regression analyzer 410 in the selection unit 480. That is, a plurality of data pairs of the reference X-ray intensity and the respective scanning depth is selected from the storing member (not shown) of the detector 200, and a regression analysis is carried out using the data pairs in the regression analyzer 410 to obtain a continuous function of the reference X-ray intensity and the respective scanning depth with a predetermined reliability. As a result, a reference intensity function is obtained to indicate a continuous variation of the reference X-ray intensity along the depth of the thin layer 24. In the same way, an inspection intensity function is also obtained to indicate a continuous variation of the inspection X-ray intensity along the depth of the layer 14.

Because the intensity of the reference X-ray is proportional to an amount of electrons of which an energy state is shifted from the ground state to the exciting state, and the amount of the shifting electrons is proportional to the excitation region $V_e$, the excitation region $V_e$ of the thin layer 24 is also proportional to the intensity of the reference X-ray. Additionally, the reference contact hole 26 is not varied in its shape along the z-axis in the thin layer 24. Accordingly, an infinitesimal intensity of the reference X-ray with respect to an infinitesimal depth of the reference specimen is expressed as the following equation (1).

$$\Delta I_{ref}=kFCf(z)\Delta V=kFCf(z)A\Delta z \tag{1}$$

In the above equation (1), "k" denotes a proportional constant for indicating a physical characteristic of the apparatus for forming the three-dimensional image, and "F" denotes an intensity of the electron beam scanned onto the thin layer on the reference specimen. "C" denotes a concentration of a particular element that generates the X-ray in its degeneracy of the energy state when the electron beam is scanned onto a scanning area, and is assumed to be constant in the whole scanning area. The function, f(z), denotes a correlation between the scanning depth and the reference X-ray that is determined by material properties of the thin layer 24 on which the reference contact hole 26 is formed. Accordingly, f(z) is a characteristic function of the thin layer 24 with respect to a depth thereof since f(z) is only influenced by the material properties of the thin layer 24. "A" denotes a size of the scanning area of the thin layer 24, thus a variation of "A" along the z-axis is a factor in the shape of the vertical profile of the contact hole 26. Accordingly, the variation of "A" along the z-axis is the vertical profile function of the contact hole 26.

If the depth of the layer is continuous along the z-axis from the top surface 24*a* of the thin layer 24 to a bottom portion of the contact hole 26 in the reference specimen, equation (1) is transformed into the following differential equation (2).

$$dI_{ref}=kFCf(z)\Delta V=kFCf(z)A_{ref}dz \tag{2a}$$

$$\frac{dI_{ref}}{dz}=kFCf(z)A_{ref} \tag{2b}$$

In the reference specimen, all components of the right portion in the differential equation (2a) or (2b) are constant except for the characteristic function, f(z), and the left portion of the differential equation (2b) is obtained in a subsequent process by differentiating the continuous reference intensity function. Accordingly, the characteristic function, f(z), of the reference specimen is obtained from the differential equation (2b).

Referring to FIG. 1, the above-mentioned process may be conducted through a computer algorithm in a function decomposer 420, and the computer algorithm includes a function differentiation algorithm and a function operation algorithm.

The function decomposer 420 includes a differentiator in the selection unit 480 and differentiates the reference intensity function with respect to the depth of the thin layer on the reference specimen to obtain a differential reference intensity function. Additionally, the function decomposer 420 decomposes the differential reference intensity function into the vertical profile function and the characteristic function of the reference specimen.

The reference contact hole 26 is assumed to not be varied through the thin layer 24, and the surface shape 26*a* of the reference contact hole 26 on the top surface 24*a* of the thin layer 24 is assumed to be substantially, identically maintained through the thin layer 24, so that the vertical profile of the reference contact hole 26 is expressed as a straight line along the z-axis, and the vertical profile function is a constant function. Accordingly, the characteristic function, f(z), of the reference specimen is obtained by dividing the differential reference intensity function by a constant, as indicated in the above differential equation (2a) or (2b). Since the material properties of the object 10 are the same as the reference specimen 20, the characteristic function of the object 10 is substantially identical to that of the reference specimen 20. The vertical profile of the reference pattern may be selected as an arbitrary profile for the convenience of obtaining the characteristic function of the layer on the object 10 and the reference specimen 20, so that the vertical profile function in differential equation (2) is not limited to the constant function. Rather, any other function known to one of the ordinary skill in the art may also be utilized as the vertical profile function in place of the constant function under the condition that the characteristic function is easily obtained. For example, a linear function may be selected as the vertical profile function of the reference specimen.

The selection unit 480 includes a comparison unit 450 for comparing the inspection X-ray and the reference X-ray in view of intensity of the X-ray and determining whether or not the inspection X-ray and the reference X-ray are substantially identical to each other within an allowable error range of the intensity. The comparison unit 450 may be implemented through a computer algorithm, and in the present embodiment, the comparison unit 450 exemplarily includes an integer comparison algorithm.

When the inspection X-ray intensity is determined to be substantially identical to the reference X-ray intensity within the allowable error range by the comparison unit 450, the vertical profile function of the reference specimen is selected and stored into a storing house 440 as an optimal vertical profile function of the inspection pattern. Accordingly, the vertical profile of the reference contact hole 26 is selected as the vertical profile of the inspection contact hole 16. That is, the inspection pattern is the same as the reference pattern within the allowable error range. In particular, when the inspection X-ray intensity is substantially identical to the measured reference X-ray intensity within the allowable error range, the start function of the reference specimen is selected and stored into the storing house 440 as an optimal vertical profile function of the inspection pattern.

When the inspection X-ray intensity is determined not to be identical to the reference X-ray intensity within the allowable error range by the comparison unit 450, an iteration process for obtaining the optimal vertical profile function is conducted through the comparison unit 450 and a function integrator 430 as follows. In the iteration process, the given vertical profile function of the reference pattern that is a constant function in the present embodiment is referred to as a start function.

In a function integrator 430, a temporary vertical profile function is substituted for the start function in the differential equation (2a) or (2b), and a temporary reference X-ray intensity is obtained by integrating the following equation (3a).

$$\frac{dI_{temp}}{dz} = kFCf(z)A(z)_{temp} \quad (3a)$$

The above-mentioned integration may also be conducted through a computer algorithm within the function integrator 430. In this embodiment, the computer algorithm includes a function integration algorithm and a function operation algorithm. In the equation (3a), the function, $A(z)_{temp}$, denotes a temporary vertical profile function with respect to a depth of the pattern on a layer, and is selected from among the typical functions in the function reservoir 310. That is, one of the typical functions is provided to the function integrator 430 through the function provider 300.

As described above, the characteristic function, f(z), is not varied in accordance with the object 10 and the reference specimen 20 since the material properties are substantially similar. In addition, the physical characteristics of the apparatus 900, which include the intensity of the electron beam and the concentration of the particular element that generates the X-ray in its degradation of the energy state are substantially similar in the object 10 and the reference specimen 20. Accordingly, the intensity difference between the inspection X-ray and the reference X-ray is only caused by the vertical profile function. As a result, a temporary vertical profile function is substituted for the start function, and a temporary reference X-ray intensity is calculated through the equation (3a). Next, the temporary reference X-ray intensity is compared with the inspection X-ray intensity to determine whether the temporary reference X-ray intensity is substantially identical to the temporary reference X-ray intensity within the allowable error range. Obtaining the temporary reference X-ray intensity and the comparison between the inspection X-ray intensity and the temporary reference X-ray intensity are iterated until the temporary reference X-ray intensity is substantially identical to the inspection X-ray intensity within the allowable error range. As described above, typical functions in the function reservoir 310 are presumptive functions that are statistically estimated to be the actual vertical profile of the inspection contact hole in an inspection process.

$$I_{inspe}=\int dI_{temp}=\int kFCf(z)A(z)_{temp}dz \quad (3b)$$

In equation (3b), $I_{inspe}$ denotes an intensity of the inspection X-ray, and the integration with respect to the z-axis is the temporary reference X-ray intensity. When equation (3b) is satisfied within the allowable error range, the temporary vertical profile function, $A(Z)_{temp}$ is selected as the optimal vertical profile function of the inspection contact hole. The optimal vertical profile function is then stored at the storing house 440. When equation (3b) is not satisfied within the allowable error range, another temporary vertical profile function is substituted for the temporary vertical profile function, and the integration and comparison utilizing equation (3b) is repeated until equation (3b) is satisfied.

Figure 4A:
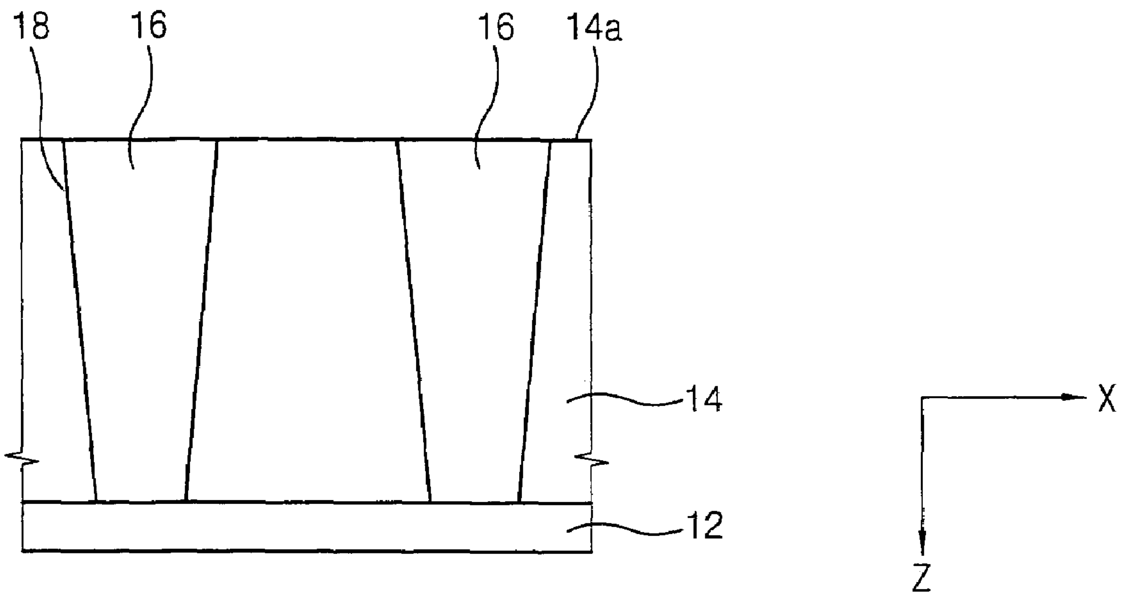
FIG. 4A is a cross sectional view taken along the depth of an inspection hole having a linear vertical profile.
Figure 4B:
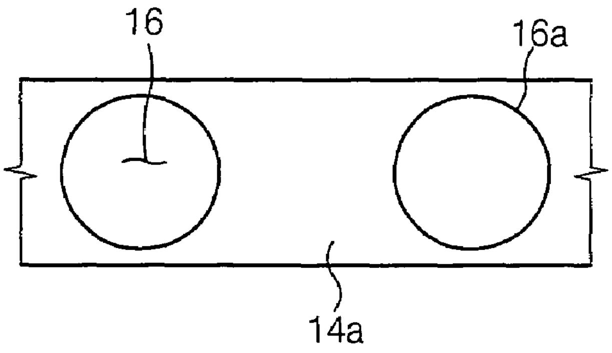
FIG. 4B is a top-down illustrating the inspection contact hole shown in FIG. 4A.
Figure 5A:
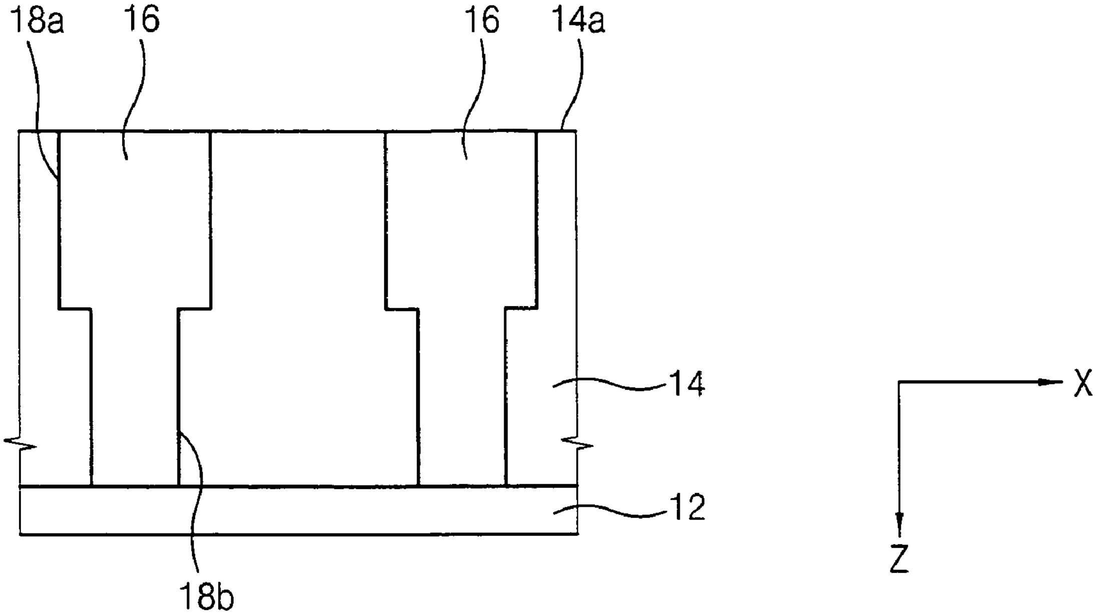
FIG. 5A is a cross-sectional view taken along the depth of an inspection contact hole having a stepped vertical profile.
Figure 5B:
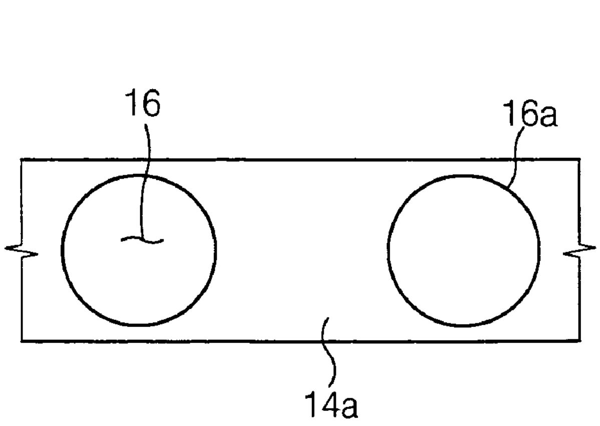
FIG. 5B is a top-down illustrating the inspection contact hole shown in FIG. 5A.

FIGS. 4A-5B are exemplary vertical profiles of the inspection contact hole. In FIGS. 4A and 4B, the vertical profile function is expressed as a linear function. FIG. 4A is a cross sectional view taken along the depth of the inspection hole, and FIG. 4B is a top-down view illustrating the inspection contact hole. In FIGS. 5A and 5B, the vertical profile function is expressed as two different constant functions. FIG. 5A is a cross sectional view taken along the depth of the inspection contact hole, and FIG. 5B is a top-down view illustrating the inspection contact hole.

Referring to FIG. 1 above, when an actual vertical profile of the inspection contact hole is expressed as the linear function as shown in FIG. 4A, the function integrator 430 and the comparison unit 450 are repeatedly employed until a temporary vertical profile function is obtained that is similar to the actual linear function within the allowable error range. The temporary vertical profile function similar to the actual linear function within the allowable error range is then stored at the storing house 440 as the optimal vertical profile function of the inspection contact hole 16.

When an actual vertical profile of the inspection contact hole is expressed as two different constant functions, as shown in FIG. 5A, the integration in accordance to the equation (3b) is conducted on each integration domain, respectively. Thus, two distinct optimal vertical profile functions are obtained, which are similar to each of the constant functions within the allowable integration domain. The storing house 440 also stores the optimal vertical profile function and provides the optimal vertical profile function to the combination unit 490, which is electrically coupled thereto.

The combination unit 490 is electrically coupled to the storing house 440 and the measuring unit 130, and combines the optimal vertical profile function in the storing house 440 and the surface shape 16*a* of the inspection pattern in the measuring unit 130 to form the three-dimensional image of the inspection pattern. In one embodiment, the surface shape 16*a* of the inspection pattern is isotropically enlarged or reduced through the depth of the layer in accordance with the optimal vertical profile function. Alternatively, a double integration of the optimal vertical profile function with respect to an effective surface of the top surface 14*a* is utilized to generate the three-dimensional image of the inspection pattern.

In the present embodiment, the profile generator 400 further includes a display unit 500 for displaying the three-dimensional image of the inspection pattern. The display unit 500 may exemplarily include a computer monitor or a liquid crystal display (LCD) device for an inspection apparatus.

According to the present invention, the three-dimensional image for an inspection pattern is obtained through an iterative process without fracturing the object. Accordingly, types and locations of the defects in the inspection pattern may be detected through the three-dimensional image of the inspection pattern to thereby increase inspection efficiency and reliability of a semiconductor device.

Figure 6:
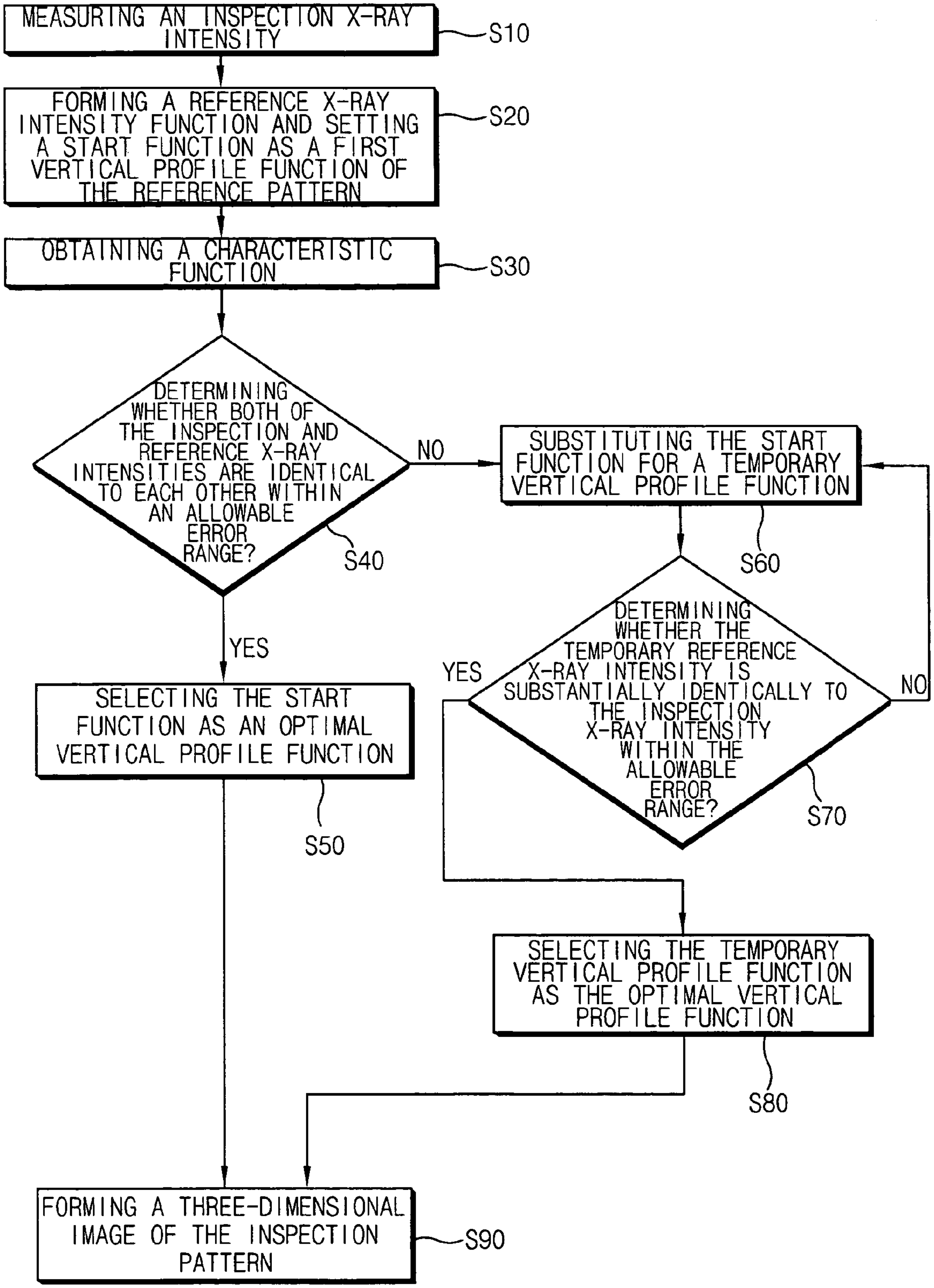
FIG. 6 is a flow chart illustrating a method of forming a three-dimensional image with respect to the inspection pattern, according to an embodiment of the present invention.

FIG. 6 is a flow chart illustrating a method of forming a three-dimensional image with respect to the inspection pattern according to the present invention.

Referring to FIGS. 1 and 6, the inspection X-ray intensity is measured using the measuring unit 130 (step S10). In one embodiment, an object 10 including the inspection pattern is positioned on the support 110 within the generator 100. In this embodiment, at least one scan area is preset to a predetermined scanning depth on the top surface of the layer in which the inspection pattern is formed. The scanning depth is regulated by adjusting the voltage applied to the scan unit 120 for scanning the electron beam onto the top surface of the layer on the object 10. Next, the electron beam is irradiated onto the scan area of the object 10 thereby reaching the scanning depth of the layer on the object 10. The excitation region $V_e$ is defined on the top surface 14*a* of the layer 14 in the scanning area of the object 10. In the excitation region $V_e$ of the layer 14, an energy state of electrons of the layer 14 is shifted from a ground state to an excited state by the electron beam, and then is degraded to the original ground state while radiating the inspection X-ray. The detector 200 detects the inspection X-ray and stores the intensity of the inspection X-ray in accordance with the corresponding scanning depth. The detector 200 transforms the inspection X-ray into an electrical signal, and detects an intensity of the electrical signal to thereby detect the inspection X-ray intensity. The SEM forms the surface shape of the inspection pattern, and stores the surface shape into a storing area.

The reference X-ray intensity function is formed and the start function is set as a first vertical profile function of the reference pattern on the reference specimen (step S20). After detecting the inspection X-ray, the reference X-ray is generated from the reference specimen including the reference pattern of which a surface shape is substantially identical to that of the inspection pattern on the object 10. In the same manner as the inspection X-ray, a plurality of the reference X-rays is generated at a plurality of scanning depths, and the detector detects each of the reference X-rays and stores the reference X-ray intensity in accordance with the corresponding scanning depth, so that the intensity of the X-ray may be expressed as a discrete function of the scanning depth. The discrete function between the intensity of the reference X-rays and the respective scanning depth is transformed into a continuous function by a regression analyzer 410 within the selection unit 480. The continuous function between the intensity of the reference X-ray and the scanning depth is referred to as the reference X-ray intensity function. As an exemplary embodiment and referring to FIGS. 3A-4B, the surface shape substantially identical to the surface shape 16*a* of the inspection pattern 16 is repeated along the depth of the reference pattern 26, so that the start function is set as a constant function. In another embodiment, the reference specimen, including the same surface shape as the inspection pattern, is cut along the depth thereof, and a SEM image is produced with respect to a cross sectional surface. Next, a vertical profile shown in the SEM picture may be used as the start function of the reference pattern.

The characteristic function of the thin layer 24 is obtained from the reference X-ray intensity function (step S30). The reference X-ray intensity function is differentiated with respect to the depth of the reference pattern at the function decomposer 420 of the selection unit 480, and the function decomposer 420 decomposes the differential reference X-ray intensity function to produce the start function and the characteristic function.

Next, the inspection X-ray intensity is compared with the reference X-ray intensity at the comparison unit 450, and the comparison unit 450 determines whether both of the X-ray intensities are substantially identical to each other within the allowable error range (step S40).

When the inspection X-ray intensity is determined to be substantially identical to the reference X-ray intensity within the allowable error range by the comparison unit 450, the start function is selected and stored into a storing house 440 as an optimal vertical profile function of the inspection pattern (step S50).

When the inspection X-ray intensity is determined not to be identical to the reference X-ray intensity within the allowable error range by the comparison unit 450, a temporary vertical profile function is substituted for the start function in a function integrator 430 (step S60) and a temporary reference X-ray intensity is determined by integrating the above equation (3a). Next, the temporary reference X-ray intensity is compared with the inspection X-ray intensity and a determination is made as to whether the temporary reference X-ray intensity is substantially identical to the inspection X-ray intensity within the allowable error range (step S70). The processes of obtaining of the temporary reference X-ray intensity and the comparison between the inspection X-ray intensity and the temporary reference X-ray intensity are repeated until the temporary reference X-ray intensity is substantially identical to the inspection X-ray intensity within the allowable error range.

When the temporary reference X-ray intensity is substantially identical to the inspection X-ray intensity by falling within the allowable error range, the temporary vertical profile function is selected as the optimal vertical profile function of the inspection pattern (step S80). The optimal vertical profile function is then stored into the storing house 440. In the present embodiment, the temporary vertical profile function is selected from among the available functions in the function reservoir 310, and the selected function is provided to the function decomposer 420 from the function provider 300.

When the temporary reference X-ray intensity is not substantially identical to the inspection X-ray intensity within the allowable error range, another temporary vertical profile function is substituted for the temporary vertical profile function, and the integration and comparison utilizing the above equation (3b) is conducted repeatedly until the temporary reference X-ray intensity is substantially identical to the inspection X-ray intensity within the allowable error range. The comparison of the reference X-ray intensity and the inspection X-ray intensity is conducted under the condition that the scanning depth of the reference X-ray is the same as that of the inspection X-ray. In the present embodiment, the allowable error range extends to within about ±10% of the inspection X-ray intensity. That is, the allowable error range reaches from about −10% to about 10% of the inspection X-ray intensity.

The combination unit 490 electrically coupled to the storing house 440 and the measuring unit 130 combines the optimal vertical profile function stored at the storing house 440 with the surface shape 16 of the inspection pattern in the measuring unit 130 to form the three-dimensional image of the inspection pattern (step S90). In the present embodiment, the surface shape 16*a* of the inspection pattern is isotropically enlarged or reduced through the depth of the layer in accordance with the optimal vertical profile function.

In the present embodiment, the three-dimensional image of the inspection pattern may be further displayed using a display unit 500. The display unit 500 may exemplarily include a computer monitor or a liquid crystal display (LCD) device for an inspection apparatus.

According to the present invention, various three-dimensional images for various inspection patterns are obtained through an iteration process without fracturing the object. Accordingly, types and locations of the defects in the inspection pattern may be easily detected through the three-dimensional image of the inspection pattern to thereby increase inspection efficiency and reliability of a semiconductor device.

Although the exemplary embodiments of the present invention have been described, it is understood that the present invention should not be limited to these exemplary embodiments but various changes and modifications can be made by one skilled in the art within the spirit and scope of the present invention as hereinafter claimed.

What is claimed is:

1. A method of forming a three-dimensional image for an inspection pattern to be inspected, comprising:

measuring an intensity of an inspection electromagnetic wave from an inspection pattern on a substrate;

measuring an intensity of a reference electromagnetic wave from a reference pattern on a reference specimen, the reference pattern having substantially similar surface shape and material properties as the inspection pattern;

decomposing a differential function from a reference intensity function, the reference intensity function defined as a continuous function of the intensity of the reference electromagnetic wave with respect to a depth of the reference pattern, the differential function decomposed into a start function and a characteristic function, the start function expressing a vertical profile function of the reference pattern and the characteristic function determining material properties of the reference pattern;

integrating the differential function of the reference intensity function repeatedly to obtain an intensity of a temporary reference electromagnetic wave, the integration including substituting a temporary vertical profile function for the start function for each integration until the intensity of the temporary reference electromagnetic wave is determined to be within an allowable error range;

selecting the substituted temporary vertical profile function as an optimal vertical profile function when the intensity of the temporary reference electromagnetic wave is within the allowable error range; and combining the surface shape of the inspection pattern and the optimal vertical profile function along a depth of the inspection pattern to form the three-dimensional image for the inspection pattern.

2. The method of claim 1, wherein measuring the intensity of the inspection electromagnetic wave includes:

irradiating an electron beam to a plurality of scanning depths, the scanning depths being spaced apart from a top surface of the inspection pattern by a predetermined distance, the irradiation of the scanning depths causing the generation of the inspection electromagnetic wave from the inspection pattern;

detecting the inspection electromagnetic wave in accordance with the corresponding scanning depth;

transforming the detected inspection electromagnetic wave into an electrical signal; and measuring an intensity of the electrical signal.

3. The method of claim 1, wherein the inspection and reference electromagnetic waves include an X-ray.

4. The method of claim 1, wherein the surface shape of the inspection pattern is obtained by a scanning electron microscope (SEM).

5. The method of claim 1, wherein forming a reference intensity function includes:

irradiating an electron beam to a plurality of scanning depths, the scanning depths being spaced apart from a top surface of the reference pattern by a predetermined distance, the irradiation of the scanning depths causing the generation of the reference electromagnetic wave from the reference pattern;

detecting the intensity of the reference electromagnetic wave in accordance with the corresponding scanning depth to form a discrete function based on the intensity of the reference electromagnetic wave and the scanning depth of the reference pattern; and transforming the discrete function into a continuous function in which the intensity of the reference electromagnetic wave is continuous with respect to the scanning depth.

6. The method of claim 5, wherein transforming the discrete function into a continuous function is conducted by a regression analysis.

7. The method of claim 1, wherein the start function is a constant function and wherein the surface shape of the reference pattern is not varied along the depth of the reference pattern.

8. The method of claim 7, wherein the characteristic function is obtained by dividing the differential function of the reference intensity function by the constant function.

9. The method of claim 1, wherein the start function is an actual vertical profile of the reference pattern and wherein the actual vertical profile function is obtained from a SEM image showing a cross sectional surface of the reference pattern taken along the depth thereof.

10. The method of claim 1, further comprising, before repeating the integration of the differential function, selecting the start function as the optimal vertical profile function when the intensity of the reference electromagnetic wave is within the allowable error range.

11. The method of claim 1, wherein the intensity of the temporary reference electromagnetic wave is compared with the intensity of the inspection electromagnetic wave at a substantially similar scanning depth when determining whether the intensity of the temporary reference electromagnetic wave is within the allowable error range.

12. The method of claim 11, wherein the allowable error range extends from about +10% to about −10% of the intensity of the inspection electromagnetic wave.

13. The method of claim 1, wherein the temporary vertical profile function is selected from a plurality of available vertical profile functions, the available vertical profile function being substantially statistically similar enough to a vertical profile of the inspection pattern that the available vertical profile is utilized as a vertical profile of the inspection pattern.

14. The method of claim 13, wherein an available vertical profile function is stored in a function reservoir and the selected available vertical profile function is provided as the temporary vertical profile function by a function provider.

15. The method of claim 1, wherein combining the surface shape and the optimal vertical profile function includes associating the surface shape of the inspection pattern with the optimal vertical profile function from a bottom to a top surface of the inspection pattern.

16. The method of claim 1, further comprising displaying the three-dimensional image for the inspection pattern on a display device.

17. An apparatus for forming a three-dimensional image for an inspection pattern to be inspected, comprising:

an electromagnetic wave generator for generating an electromagnetic inspection wave from the inspection pattern on a substrate and a electromagnetic reference wave from a reference pattern on a reference specimen, the reference pattern having a substantially similar surface shape and material properties as the inspection pattern;

a detector for detecting intensities of the electromagnetic inspection wave and the electromagnetic reference wave, and storing each intensity of the electromagnetic waves in accordance with a corresponding scanning depth from which each electromagnetic wave is generated;

a function decomposer for decomposing a differential function from a reference intensity function, the reference intensity function defined as a continuous function of the intensity of the electromagnetic reference wave with respect to a depth of the reference pattern, the function decomposer designed to decompose a differential function into a start function and a characteristic function, the start function expressing a vertical profile function of the reference pattern and the characteristic function determining material properties of the reference pattern; and a profile generator for generating the three-dimensional image for the inspection pattern, the profile generator including a selection unit for determining an optimal vertical profile function and a combination unit for combining the surface shape of the inspection pattern and the optimal vertical profile function along a depth of the inspection pattern, the optimal vertical profile function defined as a temporary vertical profile function when an intensity of a temporary electromagnetic reference wave is within an allowable error range and the temporary vertical profile is substituted for the start function.

18. The apparatus of claim 17, wherein the electromagnetic wave generator includes a support for supporting the substrate or the reference specimen, and a scanning unit for scanning an electron beam onto the inspection pattern or the reference pattern.

19. The apparatus of claim 17, further comprising a measuring unit for measuring the surface shape of the inspection pattern.

20. The apparatus of claim 19, wherein the measuring unit includes a scanning electron microscope (SEM).

21. The apparatus of claim 17, wherein the electromagnetic wave includes an X-ray.

22. The apparatus of claim 17, further comprising a function reservoir in which a plurality of available vertical profile functions is contained, and a function provider connected to the function reservoir, the available vertical profile function being substantially statistically similar enough to a vertical profile of the inspection pattern that the available vertical profile is utilized as a vertical profile of the inspection pattern, the plurality of available vertical profile functions being provided through the function provider.

23. The apparatus of claim 17, wherein the selection unit includes:

a function integrator for integrating the differential function of the reference intensity function that is decomposed into the start function and the characteristic function after a temporary vertical profile function is substituted for the start function, the integrated differential function forming a temporary reference intensity function;

a comparison unit for comparing the intensity of the electromagnetic inspection wave and the intensity of the temporary electromagnetic reference wave calculated from the temporary reference intensity function; and a storing unit for storing the optimal vertical profile function and the intensity of the temporary electromagnetic reference wave.

24. The apparatus of claim 23, wherein the selection unit further includes a regression analyzer for forming the reference intensity function from the detected intensities of the electromagnetic reference waves based on the scanning depth.

25. The apparatus of claim 23, wherein the start function includes a constant function.

26. The apparatus of claim 23, wherein the temporary vertical profile function includes one of the available vertical profile functions contained in a function reservoir, the available vertical profile function being substantially statistically similar enough to a vertical profile of the inspection pattern that the available vertical profile is utilized as a vertical profile of the inspection pattern.

27. The apparatus of claim 17, further comprising a display unit for visibly displaying the three-dimensional image for the inspection pattern.

* * * * *

UNITED STATES PATENT AND TRADEMARK OFFICE

CERTIFICATE OF CORRECTION

PATENT NO. : 7,428,328 B2
APPLICATION NO. : 11/180504
DATED : September 23, 2008
INVENTOR(S) : Yun-Jung Jee et al.

It is certified that error appears in the above-identified patent and that said Letters Patent is hereby corrected as shown below:

Column 9, line 60, the word "$A(Z)_{temp}$" should read -- $A(z)_{temp}$, --.

Signed and Sealed this

Thirteenth Day of January, 2009

JON W. DUDAS
*Director of the United States Patent and Trademark Office*